United States Patent
Oku et al.

(10) Patent No.: US 9,925,874 B2
(45) Date of Patent: Mar. 27, 2018

(54) IN-VEHICLE INFORMATION DISPLAY DEVICE AND INFORMATION DISPLAY METHOD

(71) Applicants: Nissan Motor Co., Ltd., Kanagawa (JP); DENSO CORPORATION, Kariya-shi, Aichi (JP)

(72) Inventors: Tomoyuki Oku, Kanagawa (JP); Naoki Satou, Aichi (JP)

(73) Assignees: NISSAN MOTOR CO., LTD., Kanagawa (JP); DENSO CORPORATION, Aichi (JP)

( * ) Notice: Subject to any disclaimer, the term of this patent is extended or adjusted under 35 U.S.C. 154(b) by 0 days.

(21) Appl. No.: 15/034,775

(22) PCT Filed: Oct. 30, 2014

(86) PCT No.: PCT/JP2014/005516
§ 371 (c)(1),
(2) Date: May 5, 2016

(87) PCT Pub. No.: WO2015/068368
PCT Pub. Date: May 14, 2015

(65) Prior Publication Data
US 2016/0280068 A1    Sep. 29, 2016

(30) Foreign Application Priority Data

Nov. 5, 2013    (JP) .................................. 2013-229368

(51) Int. Cl.
*G06F 3/14*        (2006.01)
*B60K 35/00*     (2006.01)
(Continued)

(52) U.S. Cl.
CPC .............. *B60K 35/00* (2013.01); *B60R 11/02* (2013.01); *G01C 21/3688* (2013.01);
(Continued)

(58) Field of Classification Search
CPC ...................... G06F 3/01423; G60K 2350/352
See application file for complete search history.

(56) References Cited

U.S. PATENT DOCUMENTS

2008/0246633 A1*  10/2008  Pouzolz .................... G01D 3/10
                                                                340/971
2012/0218295 A1*   8/2012  Hashikawa ............ B60K 35/00
                                                                345/629
(Continued)

FOREIGN PATENT DOCUMENTS

DE    10 2011 082 617 A1    3/2013
JP    2011-007701 A    1/2011

*Primary Examiner* — Lixi C Simpson
(74) *Attorney, Agent, or Firm* — Osha Liang LLP; Thomas K. Scherer; Jonathan P. Osha

(57) ABSTRACT

An in-vehicle information display device has a first display and a second display disposed in a vehicle interior, a display content determination unit configured to determine whether a first content displayed on the first display and a second content displayed on the second display are identical to each other, and a display content change unit. When the display content determination unit determines that the first and second contents are identical to each other, the display content change unit changes the first content displayed on the first display or the second content displayed on the second display to a third content associated beforehand with one of the first and second contents that have been determined to be identical.

6 Claims, 11 Drawing Sheets

(51) Int. Cl.
*B60R 11/02* (2006.01)
*G06F 3/048* (2013.01)
*G09G 5/377* (2006.01)
*G01C 21/36* (2006.01)

(52) U.S. Cl.
CPC ............ *G06F 3/048* (2013.01); *G06F 3/1423* (2013.01); *G09G 5/377* (2013.01); *B60K 2350/352* (2013.01); *G09G 2380/10* (2013.01)

(56) References Cited

U.S. PATENT DOCUMENTS

2013/0141456 A1* 6/2013 Sokolov .................... G06F 3/14
 345/620
2014/0152433 A1* 6/2014 Sugiyama .............. B60K 35/00
 340/438

* cited by examiner

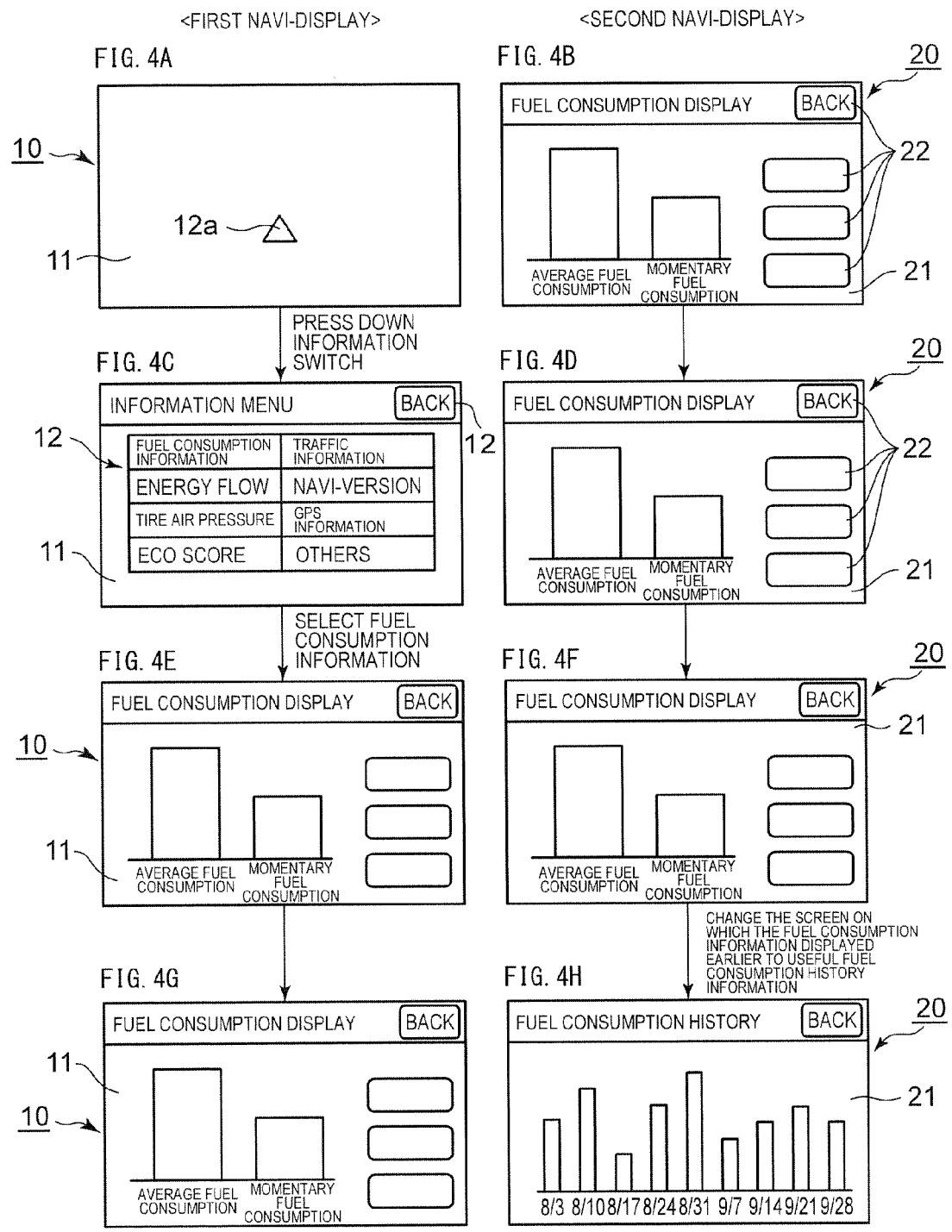

IN-VEHICLE INFORMATION DISPLAY DEVICE AND INFORMATION DISPLAY METHOD

CROSS-REFERENCE TO RELATED APPLICATIONS

The present application is a national stage application of PCT/JP2014/005516 filed Oct. 30, 2014, and claims priority to Japanese Patent Application No. 2013-229368 filed Nov. 5, 2013, the entirety of which are hereby incorporated herein by reference in their entirety.

BACKGROUND

Technical Field

This invention relates to an in-vehicle information display device and an information display method, which improve user-friendliness of the in-vehicle information display device including plural display devices.

Related Art

The technology disclosed in JP 2011-007701 is a known art relating to navigation. Such a technology discloses an electronic device having two display units. In this electronic device, a map is displayed on a first display unit, and an image based on image data that has been searched for by an image searching means is displayed on a second display unit. Hence, the electronic device is capable of displaying the image data having location information in association with the map.

SUMMARY

An in-vehicle information display device having a car navigation (hereinafter, also referred to as navi) system and a meter display unit includes several displays, such as a navi-display and a meter display. In such an in-vehicle information display device, as a result of considering easy understanding and the like in the operation, it can be considered that all the functions including a navi-function and a meter display function can be realized in each of the several displays.

In such an in-vehicle information display device, however, each display may display the same thing (that is, the same content). In this case, as each display displays an identical content, an operator feels that the displayed content in each display is redundant and such a redundancy may degrade the user-friendliness for the operator. The above-mentioned JP 2011-007701 proposes utilization of the two displays, but does not assume a behavior when the two displays display identical contents.

One or more embodiments of the present invention provides an in-vehicle information display device and an information display method, which improve the user-friendliness of the in-vehicle information display device including plural display devices.

According to one or more embodiments of the present invention, a first display and a second display are arranged beforehand in a vehicle interior. It is determined whether a content displayed on the first display and a content displayed on the second display are identical to each other. When it is determined that the contents are identical to each other, the identical content that was displayed earlier on either one of the first display or the second display is changed to another content associated beforehand with the identical content.

According to one or more embodiments of the present invention, when the first display and the second display display the identical contents, the content displayed on either one of the first display or the second display is automatically changed to another content associated with the identical content, and then two contents associated with each other are displayed closely to each other. Accordingly, as compared to a case where the identical contents are displayed in alignment, more useful information can be provided to a user without increasing the number of operations of the user, and the user-friendliness of the in-vehicle information display can be improved.

BRIEF DESCRIPTION OF DRAWINGS

FIG. 4A to FIG. 4H are conceptual diagrams illustrating an example of a screen transition in the first navi-display 10 and the second navi-display 20;

DETAILED DESCRIPTION

Figure 1:
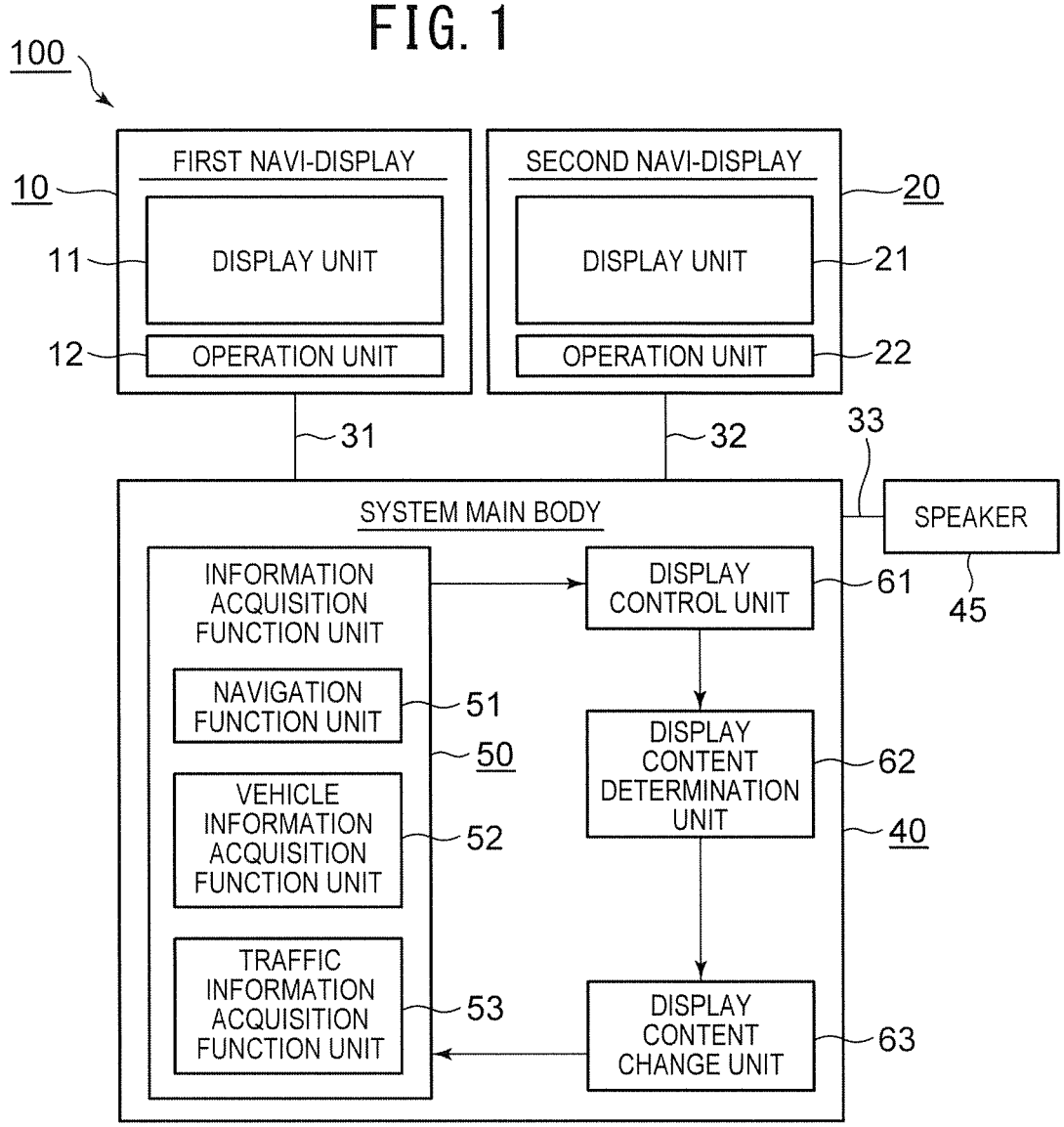
FIG. 1 is a schematic view illustrating a configuration example of an in-vehicle navigation system 100 in a first embodiment of the present invention.

Embodiments in the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. It is to be noted that in each of the drawings to be referred to below, similar components and configurations may have the same reference numerals and the repeated description thereof may be omitted.

First Embodiment

Configuration

FIG. 1 is a schematic view illustrating a configuration example of an in-vehicle navi-system (hereinafter, also referred to as navi-system) 100 in a first embodiment of the present invention. The navi-system 100 is a system capable of displaying contents related to navi on a first navi-display 10 and a second navi-display 20, respectively, so that users can operate the displays 10 and 20. As illustrated in FIG. 1, the navi-system 100 includes, for example, the first navi-display 10, the second navi-display 20, a system main body 40 to be connected to the first navi-display 10 and the second navi-display 20 through communication lines 31 and 32, respectively, and a speaker 45 to be connected through the communication line 33 to the system main body 40.

The first navi-display 10 includes, for example, a display unit 11 that displays a content, and an operation unit 12 that outputs operation information (that is, an electrical signal) depending on the operation of the user. The display unit 11 includes, for example, a liquid crystal display or an organic electroluminescence display (hereinafter, also referred to as organic EL). In addition, the operation unit includes switches, for example. When the first navi-display 10 is a touch panel, the operation unit 12 is not limited to switches arranged around the display unit 11, and may be a touchpad, a part or an entirety of which is arranged to overlap the display unit 11.

The second navi-display 20 includes, for example, a display unit 21 that displays a content, and an operation unit that outputs operation information depending on the operation of the user. Also in the second navi-display 20, the display unit 21 includes, for example, a liquid crystal display or an organic EL. In addition, the operation unit includes switches, for example. When the second navi-display 20 is a touch panel, a part or an entirety of the operation unit 22 may be a touchpad.

It is to be noted that operation units 12 and 22 are configured to output the operation information to, for example, a navi-function unit 51, a vehicle information acquisition function unit 52, and a traffic information acquisition function unit 53, respectively, of an information acquisition function unit 50, to be described later, and then to cause these units to output the information that has been acquired to a display control unit 61, to be described later.

The system main body 40 includes, for example, the information acquisition function unit 50, the display control unit 61, a display content determination unit 62, and a display content change unit 63. The information acquisition function unit 50 is configured to carry out an information acquisition function that has been set beforehand (that is, a predetermined information acquisition function) so as to acquire various pieces of information, and to output the acquired information. The information acquisition function unit 50 is configured to acquire and output the information or output the information at a timing of, for example, receiving the operation information from the operation units 12 and 22, respectively. That is to say, the information acquisition function unit 50 carries out the predetermined information acquisition function to acquire various pieces of information depending on the operation information output from the operation units 12 and 22, respectively, and then outputs the acquired information. Alternatively, the information acquisition function unit 50 carries out the predetermined information acquisition function to acquire various pieces of information beforehand, and then outputs the acquired information depending on the operation information output from the operation units 12 and 22, respectively.

The information acquisition function unit 50 includes, for example, the navi-function unit 51, the vehicle information acquisition function unit 52, and the traffic information acquisition function unit 53. The navi-function unit 51 has a navi-function including, for example, a function of receiving signals transmitted from the Global Positioning System (GPS) to measure the current location of the vehicle, a function of storing map information, and a function of operating a travel path from the current location to a destination depending on the operation information output from each of the operation units 12 and 22. In addition, the vehicle information acquisition function unit 52 includes functions of acquiring information on the vehicle, such as fuel consumption information, information on energy flow, information on tire air pressure, information on ECO score, and the like. The traffic information acquisition function unit 53 includes, for example, a function of acquiring the traffic information transmitted on ground waves.

The display control unit 61 is configured to control contents (that is, display content) to be displayed on the first and second navi-displays 10 and 20. That is to say, the display control unit 61 is configured to receive information output from the information acquisition function unit 50, and to display the content including the received information on the display unit 11 of the first navi-display 10 or the display unit 21 of the second navi-display 20. In addition, the display control unit 61 is configured, when sound data are included in the received information, to output sound from the speaker 45. Its volume can be adjusted by the operation units 12 and 22, for example.

When the information acquisition function unit 50 outputs information depending on the operation information output from the operation unit 12 of the first navi-display 10, the display control unit 61 causes the display unit 11 of the first navi-display 10 to display the content including the above information. In addition, when the information acquisition function unit 50 outputs information depending on the operation information output from the operation unit 22 of the second navi-display 20, the display control unit 61 causes the display unit 21 of the second navi-display 20 to display the content including the above information.

The display content determination unit 62 is configured to determine whether the content displayed on the display unit 11 and the content displayed on the display unit 21 are identical to each other. As will be described later, the content is determined by the display content determination unit 62, for example, whenever the content displayed on each of the display units 11 and 21 changes.

When it is determined that the content displayed on the first navi-display 10 and the content displayed on the second navi-display 20 are identical to each other, the display content change unit 63 is configured to change the content on the display unit that displayed such an identical content earlier to another content. As will be described later, the above another content is associated (that is, linked) with the identical content beforehand.

The system main body 40 illustrated in FIG. 1 is configured with various types of hardware including, for example, Central Processing Unit (CPU), Random Access Memory (RAM), Read Only Memory (ROM), a storage device such as a Hard Disk Drive (HDD), wiring of forming a communication line, an antenna for communicating with the outside, and an optical drive unit for reading recorded information in a Compact Disc (CD), a Digital Versatile Disc (DVD), or the like, by using laser beams or the like. Then, the system main body 40 is configured to read a program stored in the memory device such as ROM, and to carry out the program on the CPU so as to achieve various functions. The information acquisition function unit 50, the display control unit 61, the display content determination unit 62, and the display content change unit 63, which are illustrated in FIG. 1, are indicated by functional blocks, and are achieved by carrying out the above program in the system main body 40.

Figure 2:
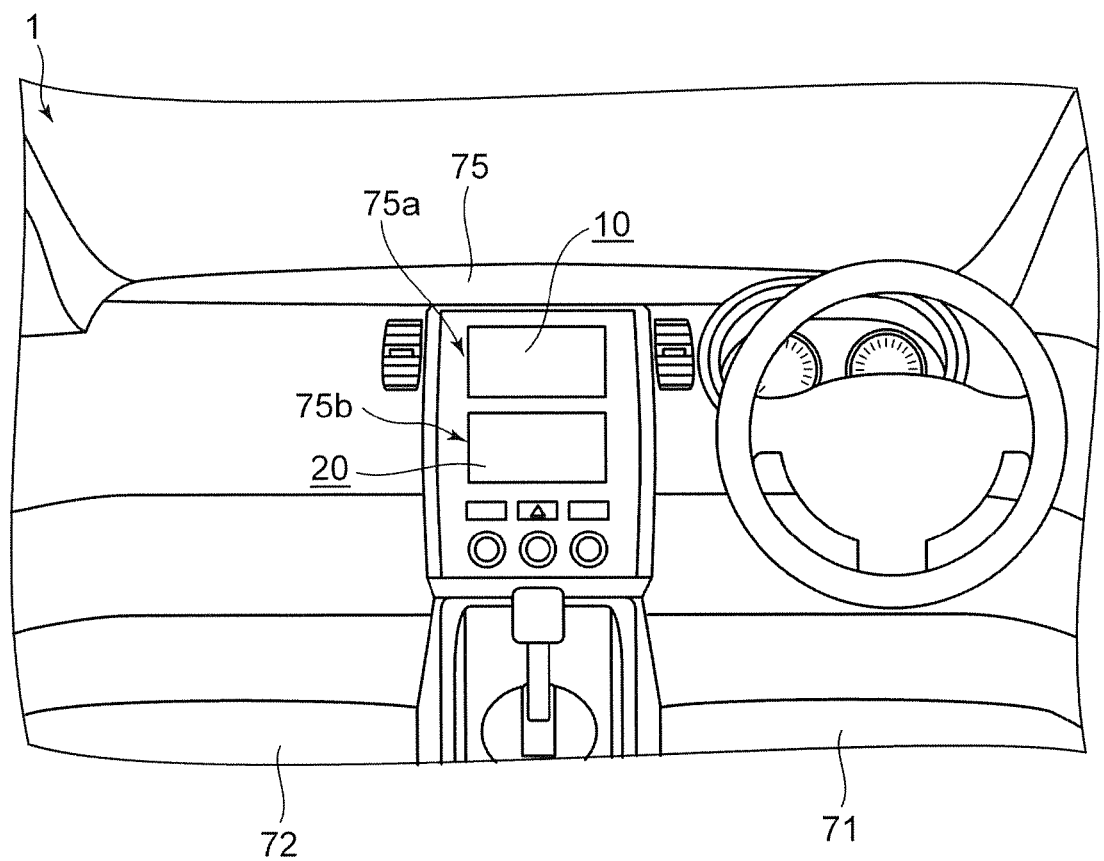
FIG. 2 is a conceptual diagram illustrating an arrangement example of a first navi-display 10 and a second navi-display 20 in the first embodiment of the present invention.

FIG. 2 is a conceptual diagram illustrating an arrangement example of the first navi-display 10 and the second navi-display 20 in the first embodiment of the present invention. As illustrated in FIG. 2, in a vehicle interior 1, a dashboard (that is, an instrument panel) 75 is arranged at a position opposed to front seats (for example, a driver's seat 71 and a front passenger's seat 72). In the dashboard 75, the first navi-display 10 is accommodated at an upper position 75a of the center part that is visible to passengers (that is, users) seated on the front seats. The second navi-display 20 is accommodated at a lower position 75b of the center part that is visible to the passengers seated on the front seats. In the vehicle interior 1, the upper position 75a and the lower position 75b are vertically aligned and arranged closely to each other. This configuration allows the passengers seated on the front seats to view the first navi-display 10 and the second navi-display 20 at the same time (that is, visually observe at the same time). In addition, the system main body 40 illustrated in FIG. 1 is arranged in, for example, a same unit with the first navi-display 10 or the second navi-display 20.

Figure 3:
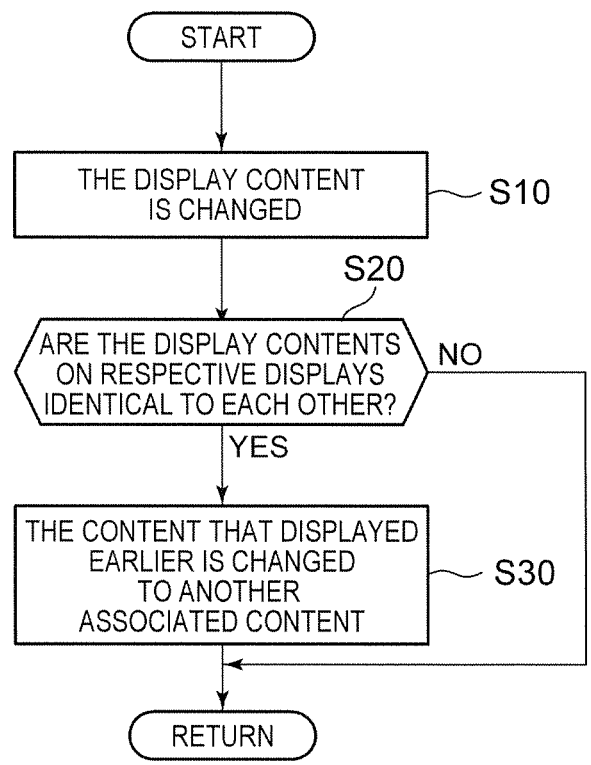
FIG. 3 is a flow chart illustrating a method of changing a display content in a navi-system 100.

FIG. 3 is a flow chart illustrating a changing method of a display content in the navi-system 100. In step S10 of FIG. 3, a user operates the operation unit 12 of the first navi-display 10 (or the operation unit 22 of the second navi-display 20), and gives an instruction to the navi-system 100 to change the display content on the first navi-display 10 (or the second navi-display 20). Then, the operation unit (or the operation unit 22) outputs the operation information depending on the instruction through the communication line 31 (or the communication line 32) to the system main body 40.

In the system main body 40, the information acquisition function unit 50 receives the operation information. Then, depending on the received operation information, the information acquisition function unit 50 carries out any one of the functions of, for example, the navi-function unit 51, the vehicle information acquisition function unit 52, or the traffic information acquisition function unit 53, to acquire the information, and then outputs the acquired information to the display control unit 61. The display control unit 61 outputs the information that has been received from the information acquisition function unit 50 to the first navi-display 10 (or the second navi-display 20), and causes the display unit 11 (or the display unit 22) to display the content including the above information.

In step S20 of FIG. 3, the display content determination unit 62 determines whether the content displayed on the first navi-display 10 and the content displayed on the second navi-display 20 are identical to each other. The display content determination unit 62 makes the above determination based on, for example, the information output from the display control unit 61 to the first navi-display 10 and the second navi-display 20, respectively. The processing goes to step S30 when they are identical, but the processing returns to start when they are not identical.

In step S30 of FIG. 3, the display content change unit 63 outputs electrical signals to the information acquisition function unit 50, and causes the display control unit 61 to output "another type of information". Herein, "another type of information" is linked beforehand with the content, which has been determined to be identical by the display content determination unit 62. The display control unit 61 outputs the received "another type of information" to the second navi-display 20 (or the first navi-display 10). The second display 20 (or the first navi-display 10) changes the content to be displayed to the content including the above "another type of information" (that is, another type of content that has been linked beforehand with the content that is determined to be identical). Then, the processing returns to start.

Next, the screen transitions of the first navi-display 10 and the second navi-display 20 will be described by corresponding to the respective steps of FIG. 3.

FIG. 4A to FIG. 4H are conceptual diagrams illustrating an example of the screen transitions on the first navi-display 10 and the second navi-display 20. FIG. 4A, FIG. 4C, FIG. 4E, and FIG. 4G illustrate display screens of the first navi-display 10, and FIG. 4B, FIG. 4D, FIG. 4F, and FIG. 4H illustrate display screens of the second navi-display 20. In this example, it is assumed that the first navi-display 10 and the second navi-display 20 are touch panels, respectively. In addition, as illustrated in FIG. 4A, it is assumed that the first navi-display 10 displays an information switch 12a, and the second navi-display 20 displays a content "fuel consumption indication", as illustrated in FIG. 4B. The information switch 12a functions as the operation unit 12 illustrated in FIG. 1.

Firstly, a user pushes down the information switch 12a to change the screen display on the first navi-display 10 to a content "information menu" (step S10). Then, as illustrated in FIG. 4C, the first navi-display 10 displays as the "information menu", for example, categories including fuel consumption information, energy flow, tire air pressure, ECO score, traffic information, navi-version, GPS information, and others. Each of these categories is not merely displayed on the screen, but functions as the operation unit 12 of the touch panel. As illustrated in FIG. 4C and FIG. 4D, since the "information menu" displayed on the first navi-display 10 and the "fuel consumption indication" displayed on the second navi-display 20 are different from each other, the second navi-display 20 continues displaying the "fuel consumption display" (step S20).

Next, the user selects and pushes down the fuel consumption information from the "information menu" to change the display screen of the first navi-display 10 to the content "fuel consumption indication" (step S10). In this case, as illustrated in FIG. 4E and FIG. 4F, the "fuel consumption indication" displayed on the first navi-display 10 and the "fuel consumption indication" displayed on the second navi-display 20 are identical to each other. Thus, as illustrated in FIG. 4H, the second navi-display 20 that displayed the "fuel consumption indication" earlier changes the display screen to a content "fuel consumption history" from the "fuel consumption indication". As illustrated in FIG. 4G, the first navi-display 10 that displayed the "fuel consumption indication" later continues displaying the "fuel consumption indication" without change.

The "fuel consumption indication" and the "fuel consumption history" are contents associated with each other beforehand in light of the fuel consumption, and belong to the same category called the fuel consumption information. The "fuel consumption history" is related to the "fuel consumption indication", and can be a determination reference when a user determines, for example, the good or bad of the average fuel consumption or the momentary fuel consumption. Therefore, the "fuel consumption history" displayed on the second navi-display 20, which is arranged closely to the "fuel consumption indication" displayed on the first navi-display 10, can be a useful content for users.

Figure 5A:
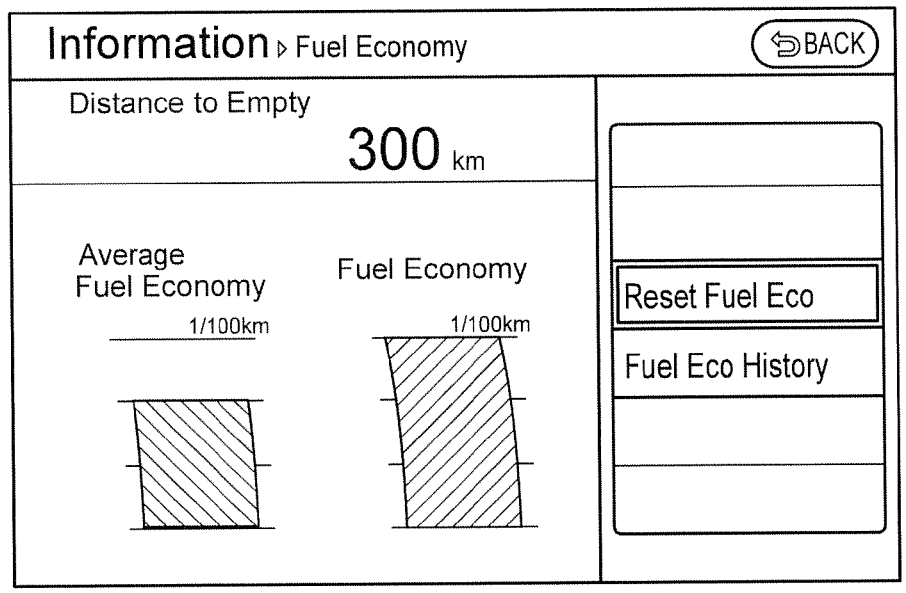
FIG. 5A and FIG. 5B are views illustrating examples of contents of "fuel consumption information" and "fuel consumption history"
Figure 5B:
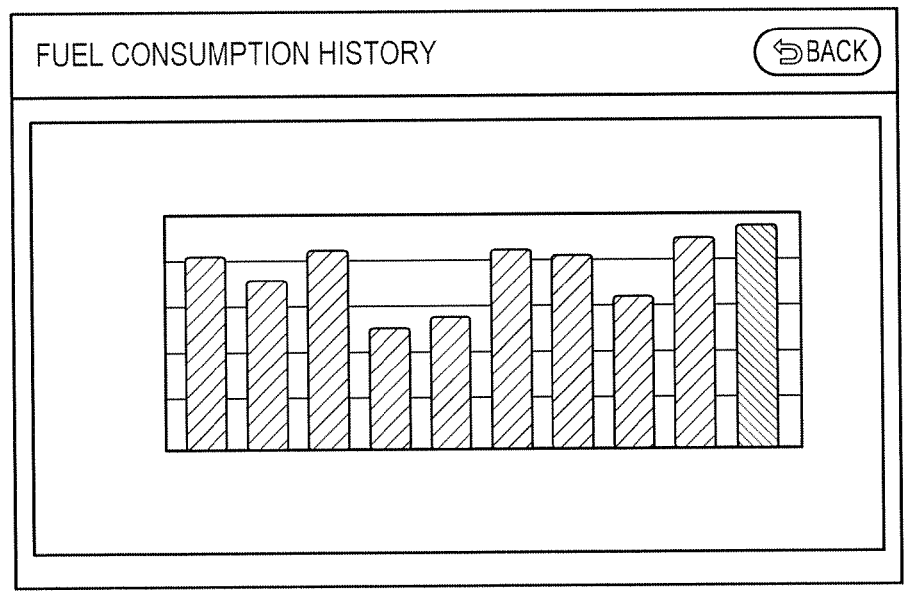

FIG. 5A and FIG. 5B are views illustrating examples of contents of "fuel consumption information" and "fuel consumption history". As illustrated in FIG. 5A and FIG. 5B, each content to be described in embodiments in the present invention may be displayed in Japanese or English, for example, and may be displayed in any language such as German, French, or Chinese. As illustrated in FIG. 5A, the "fuel consumption information" displays an index about the average fuel consumption, an index about the momentary fuel consumption, and an estimated travel distance. As illustrated in FIG. 5B, the content "fuel consumption history" displays the fuel consumption for a predetermined period (for example, each hour, each day, each week, or each month). In addition, each screen included in the touch panel may display a button for giving an instruction to reset a displayed value (for example, "Reset Fuel Eco" illustrated in FIG. 5A), a button for giving an instruction to make a screen transition to another content that belongs to the same category (for example, "Fuel Eco History" illustrated in FIG. 5A), or a button for returning to the screen previously displayed (for example, "Back" illustrated in FIG. 5B). The "fuel consumption information" and the "fuel consumption history" are both contents including vehicle information that has been acquired by the vehicle information acquisition function unit 52, for example.

It is to be noted that as to the "information menu" illustrated in FIG. 4C, for example, when a user selects and pushes down the energy flow from the "information menu", the display screen of the first navi-display 10 is changed to the content "energy monitor".

Figure 6A:
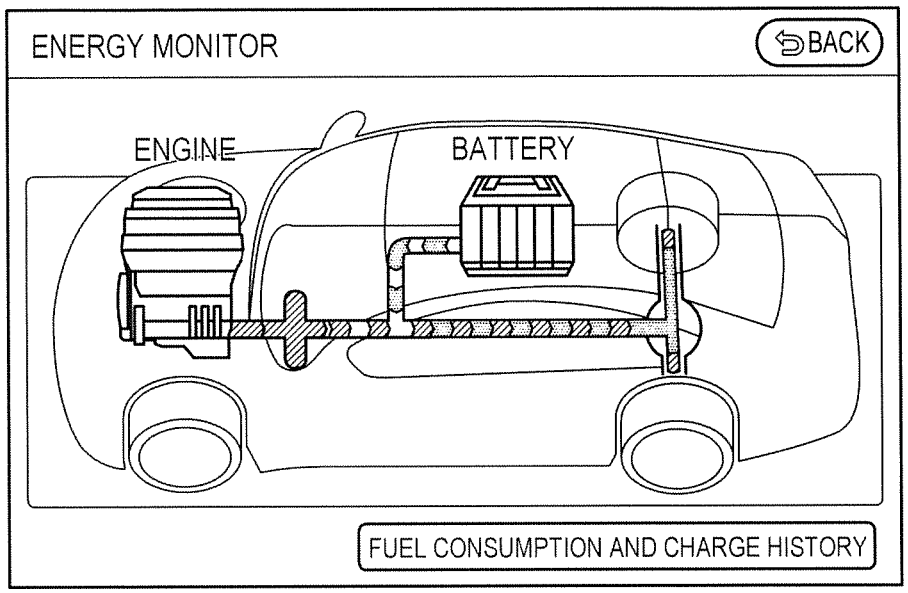
FIG. 6A and FIG. 6B are views illustrating examples of contents of "energy monitor" and "fuel consumption and charge history"
Figure 6B:
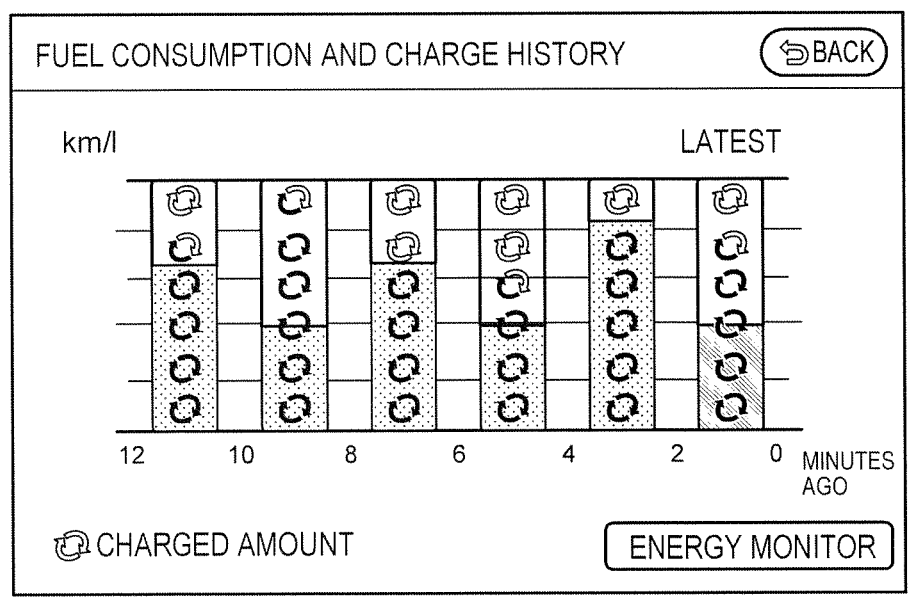

FIG. 6A and FIG. 6B are views illustrating examples of contents of "energy monitor" and "fuel consumption and charge history". As illustrated in FIG. 6A, the "energy monitor" is a screen by which, for example, the energy flow related to a Hybrid Electric Vehicle (HEV) can be understood at a glance, such as a charge state to the battery by the engine and a state of actuating the motor with the power charged in the battery. In addition, this screen displays a button for making a transition to, for example, the "fuel consumption and charge history". When this button is selected and pushed down, the screen makes a transition to the "fuel consumption and charge history" that belongs to the identical category in light of the HEV information from the "energy monitor", as illustrated in FIG. 6B. The "energy monitor" and the "fuel consumption and charge history" are both contents including the vehicle information that has been acquired by the vehicle information acquisition function unit 52, for example.

Similarly, as to the "information menu" illustrated in FIG. 4C, for example, when a user selects and pushes down the navi-version from the "information menu", the display screen of the first navi-display 10 is changed to a content "compass navi".

Figure 7A:
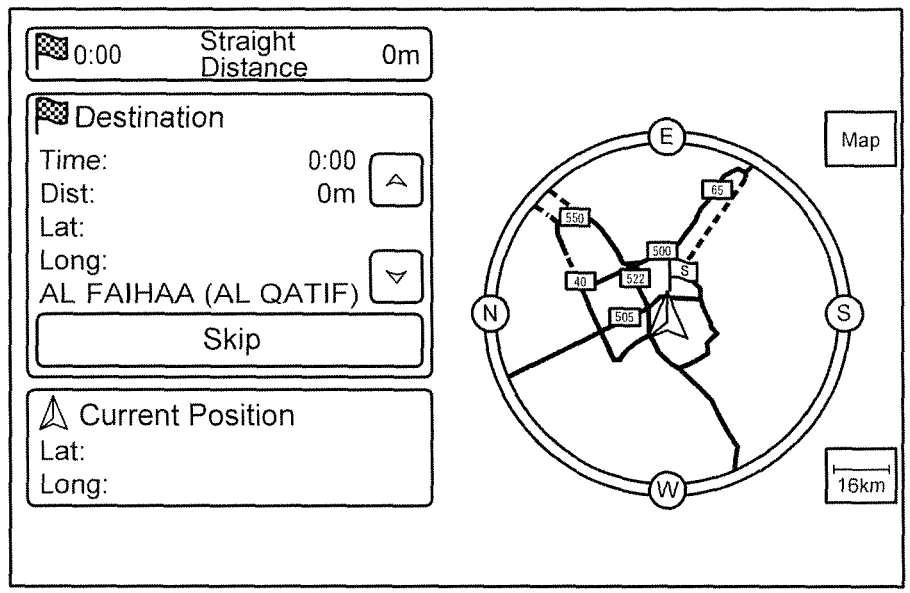
FIG. 7A and FIG. 7B are views illustrating examples of contents of "compasses navi" and "GPS current location information"
Figure 7B:
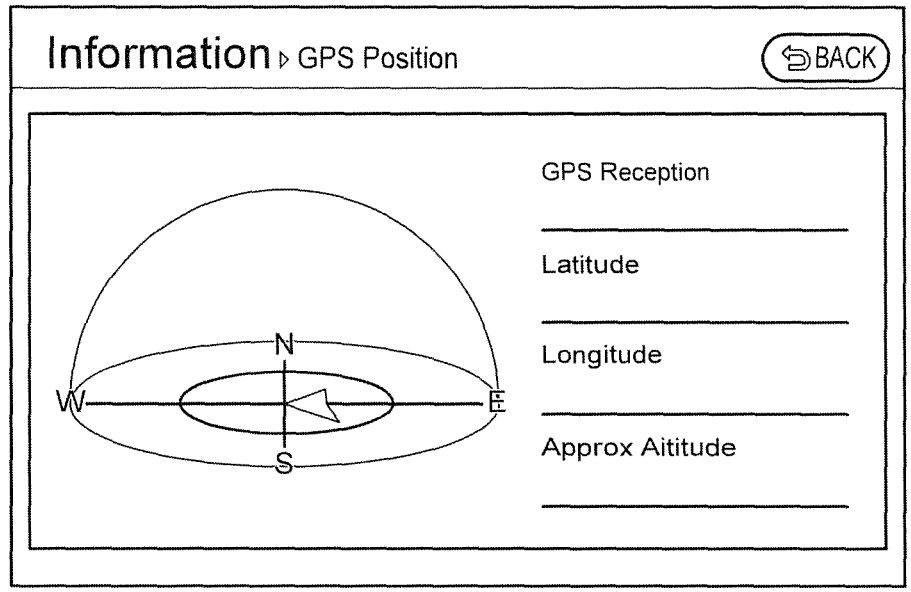

FIG. 7A and FIG. 7B are views illustrating examples of contents of "compass navi" and "GPS current location information". For example, as illustrated in FIG. 7A, the content "compass navi" displays, for example, the screen in which directions of the north, the south, the east, and the west indicated by the compass overlap the map, so that a route from a current location to a destination can be understood at a glance. In addition, this screen displays the distance from the current location to the destination, the estimated arrival time from the current location to the destination, or the like. Further, on this screen, a part of the traffic information may be displayed to overlap the map. For example, traffic jams may be displayed boldly with a color such as red having a high visibility.

Similarly, as to the "information menu" illustrated in FIG. 4C, for example, when a user selects and pushes down the GPS information from the "information menu", the display screen of the first navi-display 10 is changed to the content "GPS current location information". For example, as illustrated in FIG. 7B, the content "GPS current location information" displays the screen on which the compass and the map overlap, and displays the latitude and the longitude of the current location, the reception strength of the GPS signal, and the like. The "compass navi" and the "GPS current location information" are both contents including the navi-information that has been acquired by the navi-function unit 51, for example. In addition, the "compass navi" is also the content including the traffic information that has been acquired by the traffic information acquisition function unit 53.

Operations

Next, operation examples in the first embodiment will be described.

For example, it is assumed that the first navi-display displays the content "fuel consumption information" illustrated in FIG. 5A. The second navi-display 20 illustrated in FIG. 6A displays the content "energy monitor". In this assumption, a user touches a button displayed on the first navi-display 10 displays with a fingertip to change the display content from the "fuel consumption information" to the "fuel consumption and charge history" illustrated in FIG. 6B. In this case, the "fuel consumption and charge history" displayed on the first navi-display 10 and the "energy monitor" displayed on the second navi-display 20 are not identical to each other. Therefore, the content displayed on the second navi-display 20 is not changed. That is to say, the first navi-display 10 displays the "fuel consumption and charge history" and the second navi-display 20 displays the "energy monitor".

On the other hand, in the above assumption, the user touches a button displayed on the first navi-display 10 with a fingertip to return the display screen to the "information menu" once, and then selects and pushes down the energy flow from the "information menu". In this case, the "energy monitor" displayed on the first navi-display 10 and the "energy monitor" displayed on the second navi-display 20 are identical to each other. Thus, the display content of the second navi-display 20 is automatically changed. For example, since the "energy monitor" and the "fuel consumption and charge history" illustrated in FIG. 6B are linked with each other beforehand, the second navi-display 20 changes the "energy monitor" to the "fuel consumption and charge history", and displays the "fuel consumption and charge history".

Accordingly, For example, in the vehicle interior 1 illustrated in FIG. 2, the first navi-display 10 arranged at the upper position 75a of the center of the dashboard 75 displays the "energy monitor", and the second navi-display 20 arranged at the lower position 75b of the center displays the "fuel consumption and charge history". The first navi-display 10 and the second navi-display 20 are vertically aligned and arranged closely to each other. This configuration allows the user to view the "energy monitor" and the "fuel consumption and charge history" at the same time.

In one or more embodiments of the present invention, the first navi-display 10 corresponds to "a first display unit", and the second navi-display 20 corresponds to "a second display unit". In addition, according to one or more embodiments of the present invention, the operation unit 12 corresponds to "a first user operation unit", and the operation unit 22 corresponds to "a second user operation unit". In addition, according to one or more embodiments of the present invention, the navi-function unit 51 corresponds to "a first information acquisition function unit", and the vehicle information acquisition function unit 52 corresponds to "a second information acquisition function unit". In addition, according to one or more embodiments of the present invention, the content "compass navi" illustrated in FIG. 7A corresponds to "a first information content", and the content "fuel consumption information" illustrated in FIG. 5A corresponds to "a second information content". Further, according to one or more embodiments of the present invention, the navi-system 100 corresponds to "an in-vehicle information display device".

The first embodiment may have one or more of the following advantages.

(1) The display content determination unit 62 determines whether the content displayed on the first navi-display 10 and the content displayed on the second navi-display 20 are identical to each other. Then, when the display content determination unit 62 determines that they are identical, the display content change unit 63 causes one of the first navi-display 10 or the second navi-display 20 that displayed "the content that has been determined identical" earlier to change the displayed content to another one from "the content that has been determined identical". Here, another content denotes a content associated beforehand with "the content that has been determined identical". In this manner, when the first and second navi-displays 10 and 20 display the identical contents, one of the identical contents is automatically changed to another content associated with the identical content, and the two contents associated with each other are closely displayed.

This configuration provides the user with more useful information and improves the user-friendliness of the navi-system, without increasing the user's operation number of times, as compared to a case where the identical contents are displayed in alignment. That is to say, in a known technology, the behaviors when two displays display the identical contents cannot be assumed, and the user-friendliness is not sufficient. In contrast, in one or more embodiments in the present invention, the content that was displayed earlier is automatically changed to a useful content, and the user-friendliness can be improved. In addition, by automatically changing the content, a new and useful content, for example, which has little chance to be found by the user's voluntary operation, can be provided to the user.

(2) In addition, the display content determination unit 62 determines whether the content displayed on the first navi-display 10 and the content displayed on the second navi-display 20 are identical to each other, whenever either one of the first navi-display 10 or the second navi-display 20 changes the content.

This configuration reduces an opportunity that the first and second navi-displays 10 and 20 display the identical contents (or reduces a displaying period), and thus the user-friendliness of the navi-system can be further improved.

(3) In addition, when the information acquisition function unit 50 outputs information depending on the operation information output from the operation unit 12 of the first navi-display 10, the display control unit 61 causes the display unit 11 of the first navi-display 10 to display the content including the above information. In addition, when the information acquisition function unit 50 outputs information depending on the operation information output from the operation unit 22 of the second display 20, the display control unit 61 causes the display unit 21 of the second navi-display 20 to display the content including the above information.

Accordingly, on each of the first and second navi-displays 10 and 20, the implementation of the function included in the information acquisition function unit 50 is instructed and the result can be displayed.

(4) In addition, the information acquisition function unit 50 includes, for example, the navi-function unit 51 configured to carry out a navi-function to acquire the navi-information, and to output the acquired navi-information, and the vehicle information acquisition function unit 52 configured to carry out a vehicle information acquisition function to acquire the vehicle information, and to output the acquired vehicle information. When receiving the navi-information output from the navi-function unit 51, the display control unit 61 causes the first navi-display 10 or the second display 20 to display the content including the navi-information (for example, the "compasses navi-information" illustrated in FIG. 7A). In addition, when receiving the vehicle information output from the vehicle information acquisition function unit 52, the display control unit 61 causes the first navi-display 10 or the second display 20 to display the content including the vehicle information (for example, the "fuel consumption information" and the like illustrated in FIG. 5A).

Accordingly, on each of the first and second navi-displays 10 and 20, an instruction is given to carry out each of the functions included in the information acquisition function unit 50 (for example, the navi-function, the vehicle information acquisition function, and the like) and the result can be displayed.

Second Embodiment

In the above-described first embodiment, the descriptions have been given of the navi-system 100 that includes the first navi-display 10 and the second navi-display 20, and on each of the first navi-display 10 and the second navi-display 20, an instruction is given to carry out each of the functions included in the information acquisition function unit 50 (for example, the navi-function, the vehicle information acquisition function, and the like) and the result is displayed. However, the in-vehicle information display device according to one or more embodiments of the present invention is not limited to a navi-system. The in-vehicle information display device in one or more embodiments of the present invention may be, for example, an in-vehicle apparatus system including a navi-function and an audio function. In the second embodiment, such an embodiment will be described.

Configuration

Figure 8:
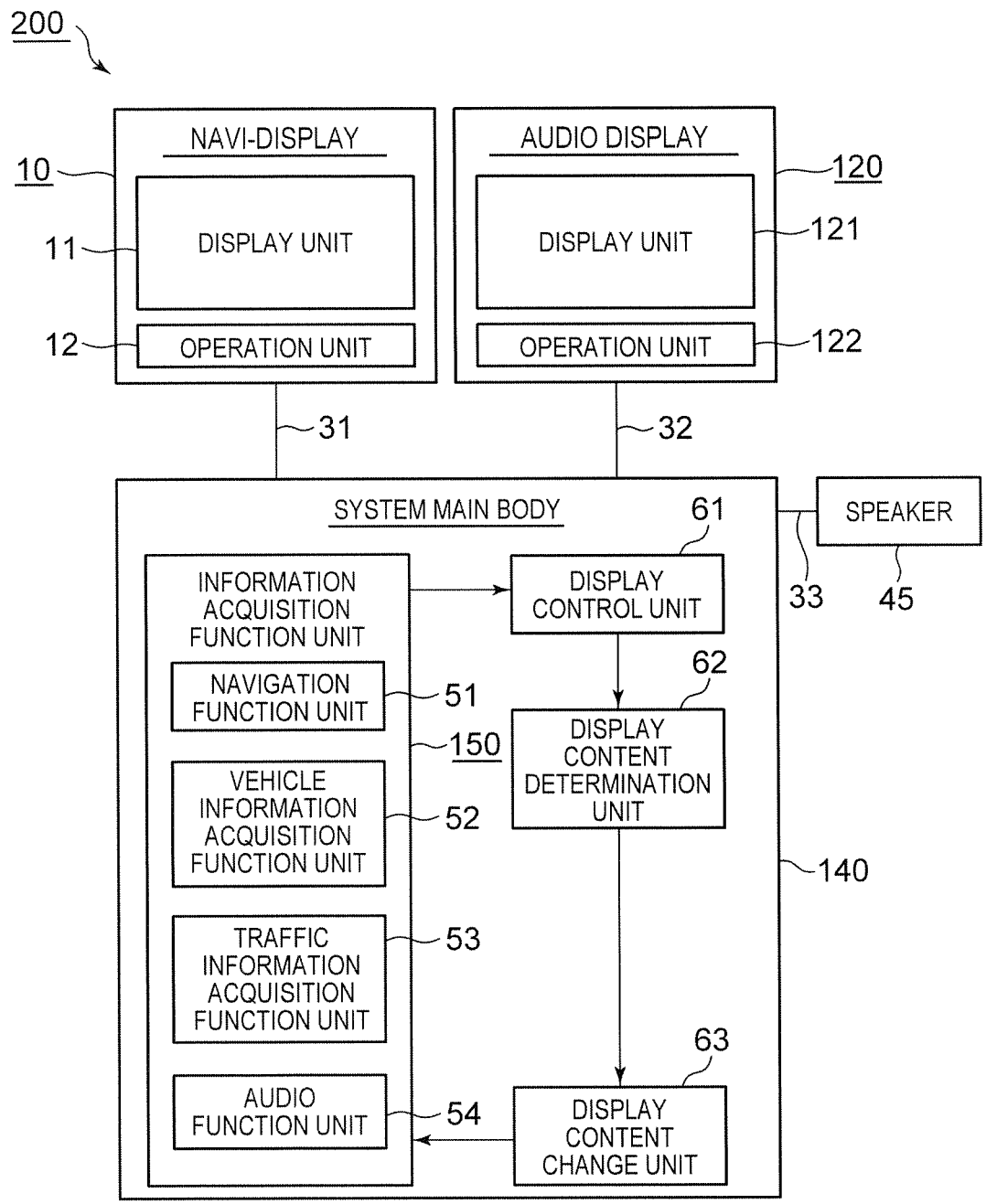
FIG. 8 is a schematic view illustrating a configuration example of an in-vehicle device system 200 in a second embodiment of the present invention.

FIG. 8 is a schematic view illustrating a configuration example of an in-vehicle device system 200 in a second embodiment of the present invention. The navi-system 100 is a system capable of displaying contents about the navigation respectively on the navi-display 10 and an audio display 120, so as to allow the operation. As illustrated in FIG. 8, the in-vehicle device system 200 includes, for example, the navi-display 10, the audio display 120, a system main body 140 that is connected with the navi-display 10 and the audio display 120 through communication lines 31 and 32, respectively, and the speaker 45 that is connected through the communication line 33 to the system main body 140.

The audio display 120 includes, for example, a display unit 121 that displays contents, and an operation unit 122 that outputs operation information in accordance with the operation of the user. For example, the display unit 121 includes, for example, a liquid crystal display, an organic electroluminescence, or the like. In addition, the operation unit 122 includes, for example, switches. When the audio display 120 is a touch panel, a part or an entirety of the operation unit 22 may be a touchpad. The operation units 12 and 122 are configured to be capable of respectively outputting the operation information to, for example, the navi-function unit 51, the vehicle information acquisition function unit 52, the traffic information acquisition function unit 53, and an audio function unit 54, of an information acquisition function unit 150, as will be described later, so as to cause the display control unit 61 to output the information that has been acquired.

The system main body 140 includes, for example, the information acquisition function unit 150, the display control unit 61, the display content determination unit 62, and the display content change unit 63. In the above units, the information acquisition function unit 150 is a function unit configured to include a predetermined information acquisition function in a similar manner to the information acquisition function unit 50 that has been described in the first embodiment. For example, the information acquisition function unit 150 is configured to carryout the predetermined information acquisition function depending on the operation information output from each of the operation units 12 and 122 to acquire various types of information, and to output the acquired various types of information.

The information acquisition function unit 150 includes, for example, the navi-function unit 51, the vehicle information acquisition function unit 52, the traffic information acquisition function unit 53, and the audio function unit 54. The audio function unit 54 includes functions of, for example, receiving radio broadcasting or television broadcasting, or playing and outputting voice data, music data, image data, or the like stored in various storage devices.

The display control unit 61 includes functions of, for example, receiving the audio information output from the audio function unit 54, displaying the content including the received audio information on the display unit 11 of the navi-display 10 or the display unit 121 of the audio display 120, and in addition, causing the speaker 45 to output sounds. The contents including the audio information may be, for example, "audio information" or "album cover flow", as will be described later.

The system main body 140 illustrated in FIG. 8 includes varies types of hardware, in a similar manner to the system main body 40 that has been described in the first embodiment, for example, storage devices such as CPU, RAM, ROM, and HDD, wiring configuring communication lines, an antenna for communication with the outside, an optical drive device that reads audio information recorded in a CD, DVD, or the like, by using laser beams. Then, the system main body 140 is configured to read a program stored in storage devices such as the ROM, and to carry out the program on the CPU to accomplish various functions.

Figure 9:
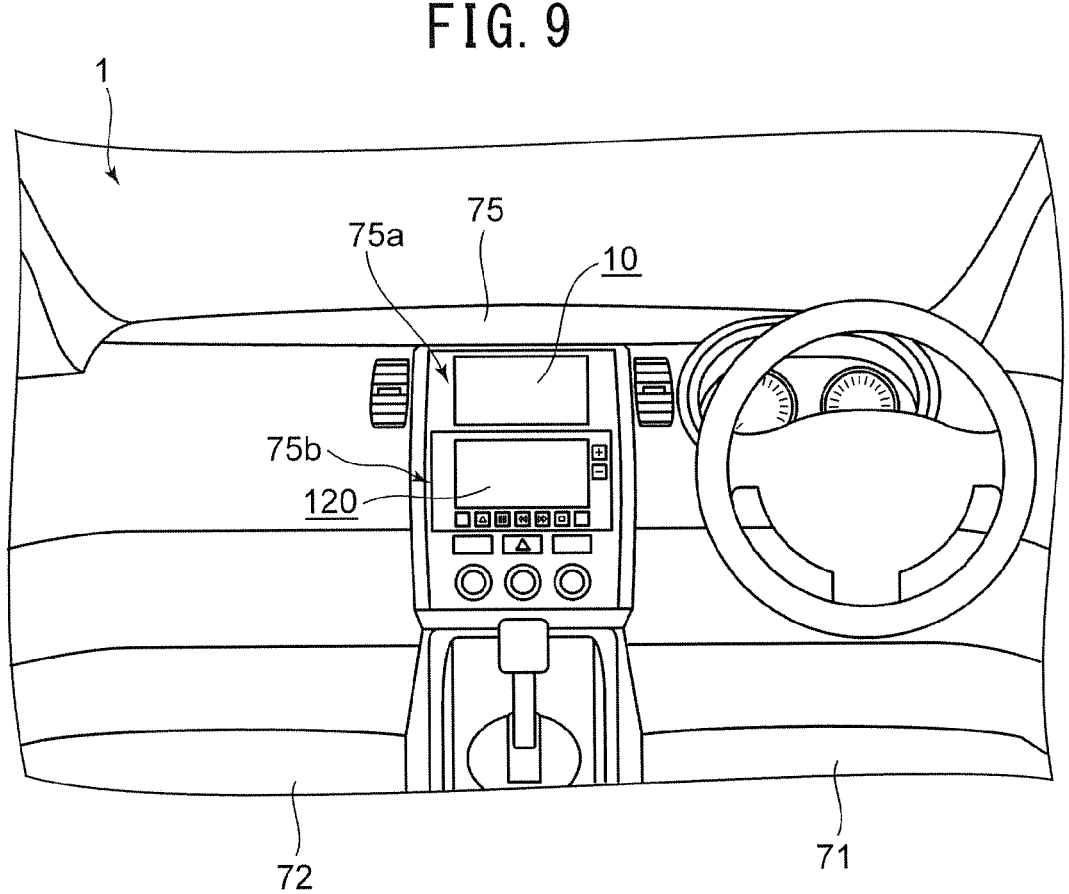
FIG. 9 is a conceptual diagram illustrating an arrangement example of a navi-display 10 and an audio display 120 in the second embodiment of the present invention.

FIG. 9 is a conceptual diagram illustrating an arrangement example of the navi-display 10 and the audio display 120 in the second embodiment of the present invention. As illustrated in FIG. 9, in the dashboard 75, the first navi-display 10 is accommodated at the upper position 75a of the center that is visible to passengers seated on the front seats (for example, the driver's seat 71 and the front passenger's seat 72). The audio display 120 is accommodated at the lower position 75b of the center that is visible to the passengers seated on the front seats. In the vehicle interior 1, the upper position 75a and the lower position 75b are vertically aligned and arranged closely to each other. This configuration allows the passengers seated on the front seats to view the navi-display 10 and the audio display 120 at the same time. In addition, the system main body 140 illustrated in FIG. 9 is arranged in, for example, a unit same with the first navi-display 10 or the second navi-display 20.

Figure 10A:
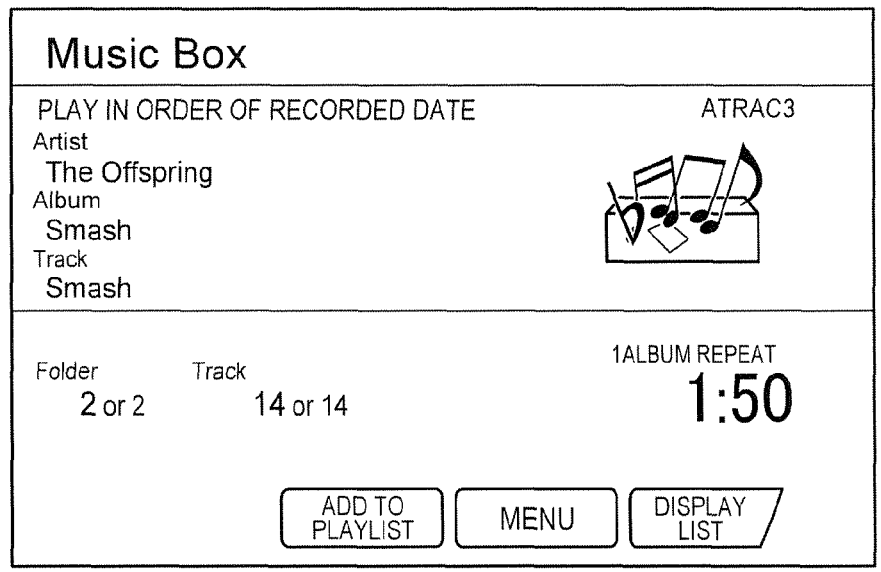
FIG. 10A and FIG. 10B are views illustrating examples of contents "audio information" and "album cover flow"
Figure 10B:
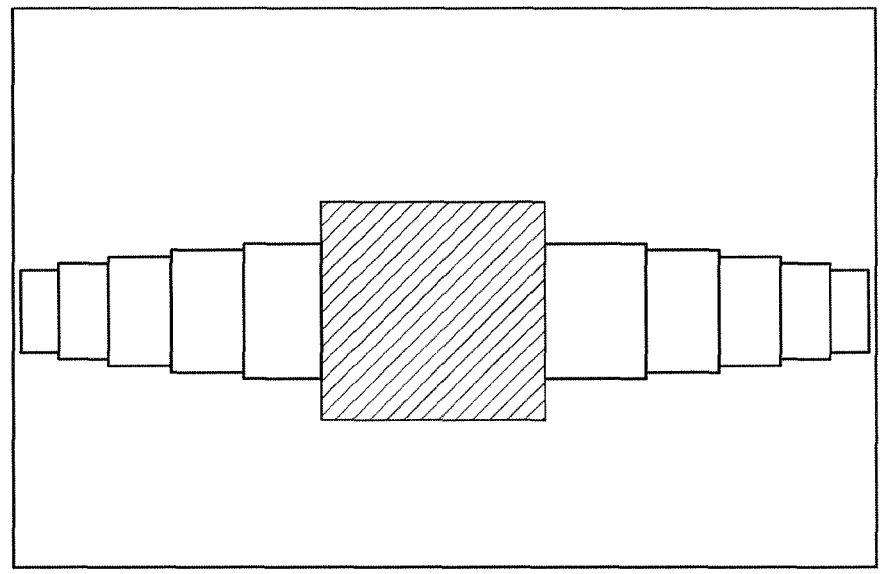

FIG. 10A and FIG. 10B are views illustrating examples of contents "audio information" and "album cover flow". For example, as illustrated in FIG. 10A, the content "audio information" displays an artist name, an album name, a truck number, so that audio information of the content that is being played can be understood at a glance. In addition, for example, as illustrated in FIG. 10B, the content "album cover flow" is displayed to understand the album cover that is being played at a glance. The "audio information" and the "album cover flow" are linked beforehand with each other.

The method of changing the display content in the in-vehicle device system 200 is similar to the method of changing the display content in the navi-system 100 that has been described in the first embodiment (see FIG. 3). For example, when the navi-display 10 and the audio display 120 both display the contents of the "audio information", the display that displayed the "audio information" earlier is changed to the displayed content from the "audio information" to the "album cover flow".

In one or more embodiments of the present invention, for example, the navi-display 10 corresponds to "a first display unit", the audio display 120 corresponds to "a second display unit", and the operation unit 22 corresponds to "a second user operation unit". In addition, according to one or more embodiments of the present invention, the audio function unit 54 corresponds to "a second information acquisition function unit", and the content of the "audio information" illustrated in FIG. 10A corresponds to "a second information content". In addition, according to one or more embodiments of the present invention, the in-vehicle device system 200 corresponds to "an in-vehicle information display device". The other correspondence relationships are the similar to those in the first embodiment.

The second embodiment may have advantages similar to advantages (1) to (4) in the first embodiment.

In addition, since the in-vehicle device system 200 displays the audio information, there may be another advantage of providing more information to.

Figure 11:
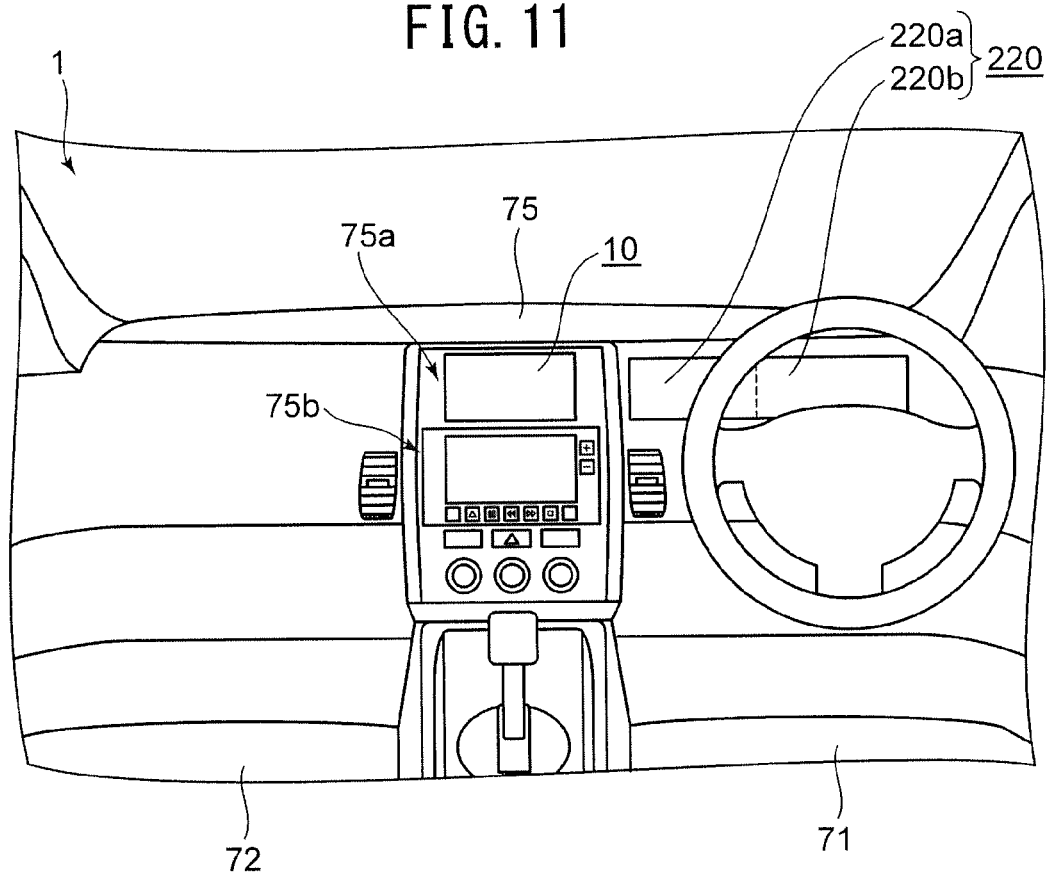
FIG. 11 is a conceptual diagram illustrating an arrangement example of the navi-display 10 and a meter display 220 in another embodiment of the present invention.

Variations (1) In the first embodiment, the case where "the second display unit" may be the second navi-display has been described. In the second embodiment, the case where "the second display unit" may be the audio display has been described. However, "the second display unit" is not limited to this. For example, as illustrated in FIG. 11, "the second display unit" may be a meter display 220.

The meter display 220 includes a first display unit 220a that displays a content, and a second display unit 220b that displays the speed and the like. The first display unit 220a is arranged closely to the navi-display 10. The display units 220a and 220b each include, for example, a liquid crystal display, an organic electroluminescence, or the like. In addition, the meter display 220 is a touch panel, and a part or an entirety of the operation unit is a touchpad. Even in such a configuration, in the meter display 220, since the first display unit 220a that displays a content is arranged closely to the navi-display 10, the method of changing the display content, for example, as illustrated in FIG. 3, may provide similar advantages as advantages (1) to (4) in the first embodiment.

(2) In addition, in the first and second embodiments of the present invention, in the vehicle interior 1, the case where two displays are aligned at the positions visible to the user has been described. In one or more embodiments of the present invention, however, there is no limitation to two displays aligned at the positions visible to the user. Three or more displays may be arranged. For example, in FIG. 11, the navi-display 10 may be "a first display", the audio display 120 may be "a second display", and the meter display 220 may be "a third display". In the first to third displays, when two displays display the identical content, one of the displays that displayed the identical content earlier is made to change its display content. The method of changing the display content is similar to the method of changing the display content that has been described in the first embodiment (see FIG. 3). Even in such a configuration, the advantages similar to the advantages (1) to (4) in the first embodiment may be obtainable.

(3) In addition, in the first and second embodiments, the case where the first display unit and the second display unit are arranged at the positions opposing the front seats in the vehicle interior has been described. In one or more embodiments of the present invention, however, the positions of the first display unit and the second display unit are not limited to the positions opposing the front seats in the vehicle interior. The positions may be any other place in the vehicle interior. The positions of the first display unit and the second display unit may be, for example, positions opposing back seats in the vehicle interior. In such a case, it is possible to provide users who are seated on the back seats with more useful information without increasing a user's operation.

(4) In addition, in the first and second embodiments, the case where the first display unit and the second display unit are aligned (that is, arranged in a same line) has been described. In one or more embodiments of the present invention, however, the first display unit and the second display unit may not be aligned with each other, and may be, for example, simply arranged closely to each other.

Herein, although a limited number of the embodiments have been described and illustrated, the scope of right is not limited to them. It should be apparent that modifications of the embodiments based on the above disclosure may occur to one skilled in the art. Those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 10 (first) navi-display
11, 21, 121 display unit
12, 22, 122 operation unit
12a information switch
20 second navi-display
31, 32, 33 communication line
40, 140 system main body
45 speaker
50, 150 information acquisition function unit
51 navi-function unit
52 vehicle information acquisition function unit
53 traffic information acquisition function unit
54 audio function unit
61 display control unit
62 display content determination unit
63 display content change unit
71 driver's seat
72 front passenger's seat
75 dashboard
75a upper position
75b lower position
100 in-vehicle device system
100 navi-system
120 audio display
200 in-vehicle device system
220 meter display
220a first display unit
220b second display unit

The invention claimed is:

1. An in-vehicle information display device comprising:
a first display and a second display disposed in a vehicle interior;
a display controller configured to start to display a first content on the first display depending on an operation by a user;
a display content determination unit configured to determine whether the first content displayed on the first display is identical to a second content that has been displayed on the second display since before the first content is displayed on the first display; and
a display content change unit,
wherein, when the display content determination unit determines that the first and second contents are identical to each other, the display content change unit changes a content to be displayed on the second display to a third content associated beforehand with the second content.

2. The in-vehicle information display device according to claim 1,
wherein, whenever the first content displayed on the first display or the second content displayed on the second display is changed, the display content determination unit performs a determination of whether the first content displayed on the first display and the second content displayed on the second display are identical to each other.

3. The in-vehicle information display device according to claim 1, further comprising:
an information acquisition function unit configured to carry out a predetermined information acquisition function to acquire information, and to output the information that has been acquired,
wherein the display controller is configured to receive the information output from the information acquisition function unit, and to display a content including the information on the first display or the second display,
wherein the first display comprises a first user operation unit configured to output first operation information depending on an operation of a user to the information acquisition function unit,
wherein the second display comprises a second user operation unit configured to output operation information depending on an operation of the user to the information acquisition function unit,
wherein the display controller is configured to display the content including the information as the first content on the first display, when the information acquisition function unit outputs the information depending on the operation information output from the first user operation unit, and
wherein the display controller is configured to display the content including the information as the second content on the second display, when the information acquisition function unit outputs the information depending on the operation information output from the second user operation unit.

4. The in-vehicle information display device according to claim 3, wherein the information acquisition function unit comprises:

a first information acquisition function unit configured to carry out a predetermined first information acquisition function to acquire first information, and to output the acquired first information; and a second information acquisition function unit configured to carry out a predetermined second information acquisition function to acquire second information, and to output the acquired second information, wherein the display controller is configured to display, upon receipt of the first information output from the first information acquisition function unit, a first information content including the first information on the first display or the second display, and wherein the display controller is configured to display, upon receipt of the second information output from the second information acquisition function unit, a second information content including the second information on the first display or the second display.

5. The in-vehicle information display device according to claim 2, further comprising:

an information acquisition function unit configured to carry out a predetermined information acquisition function to acquire information, and to output the information that has been acquired, wherein the display controller is configured to receive the information output from the information acquisition function unit, and to display a content including the information on the first display or the second display, wherein the first display comprises a first user operation unit configured to output first operation information depending on an operation of a user to the information acquisition function unit, wherein the second display comprises a second user operation unit configured to output operation information depending on an operation of the user to the information acquisition function unit, wherein the display controller is configured to display the content including the information as the first content on the first display, when the information acquisition function unit outputs the information depending on the operation information output from the first user operation unit, and wherein the display controller is configured to display the content including the information as the second content on the second display, when the information acquisition function unit outputs the information depending on the operation information output from the second user operation unit.

6. An information display method comprising:

starting to display a first content on a first display depending on an operation by a user, the first display being disposed in a vehicle interior;

determining whether the first content displayed on the first display is identical to a second content that has been displayed on a second display since before the first content is displayed on the first display, the second display being disposed in the vehicle interior; and changing, when a determination is made that the first and second contents are identical to each other, a content to be displayed on the second display to a third content associated beforehand with the second content.

* * * * *